3,292,367
IGNITION OF JET ENGINES

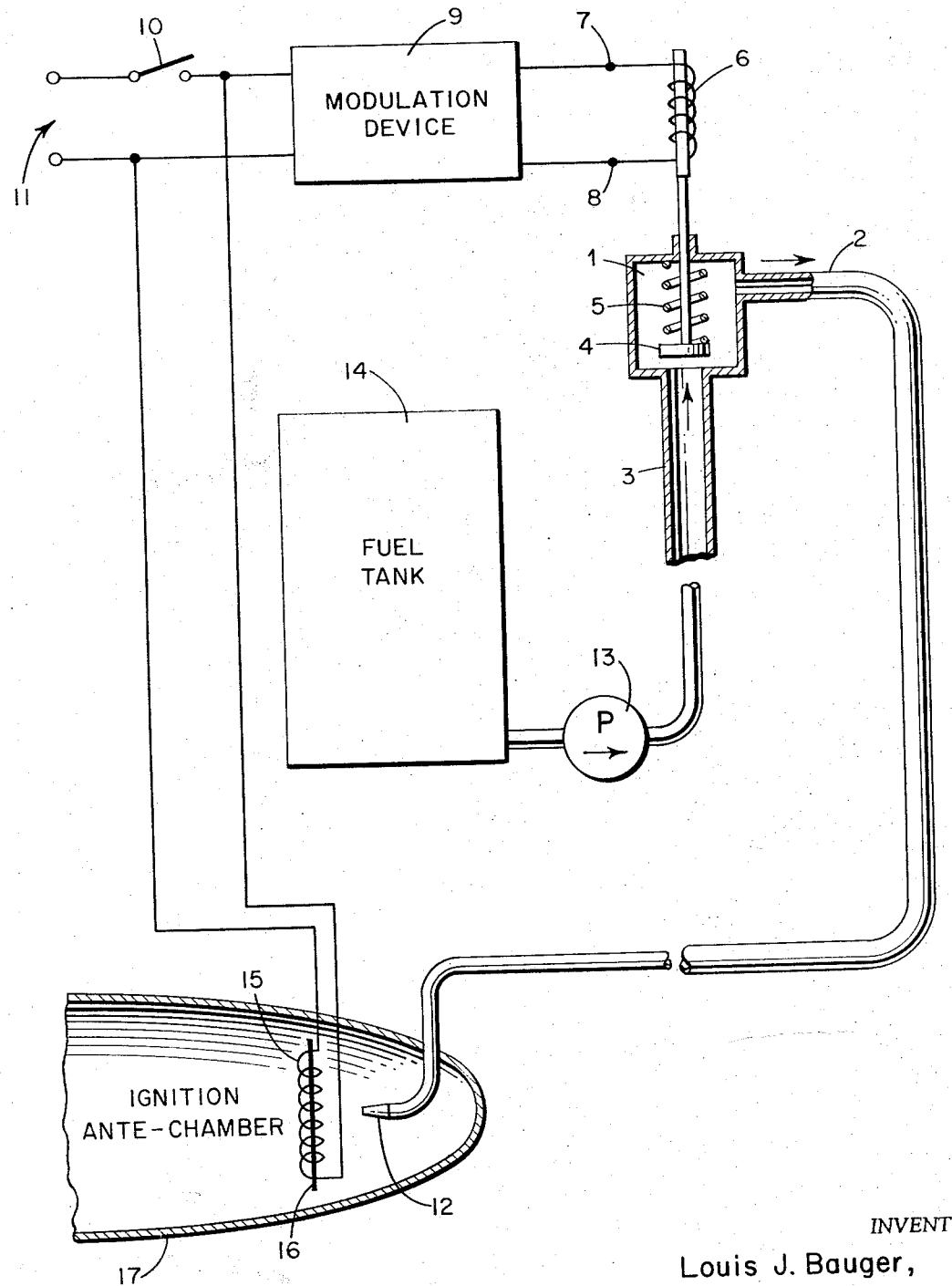

Louis Jules Bauger, Vanves, and Pierre Jean Victor Negre, Paris, France, assignors to Societe Nationale d'Etude et de Construction de Moteurs d'Aviation, Paris, France, a company of France
Filed Mar. 23, 1964, Ser. No. 354,013
Claims priority, application France, Mar. 28, 1963, 929,669
4 Claims. (Cl. 60—39.14)

The invention relates to the ignition or re-ignition of aviation jet engines and it is an object thereof to provide means to enable jet engines to be successfully ignited or re-ignited in the various conditions of temperature and altitude under which they are called upon to operate.

In all ignition arrangements for combustion chambers in use in turbo-jet engines, it is necessary to modify the control of the fuel pressure prevailing on starting according to the fuel employed. In accordance with the nomenclature used in France, the various fuels are identified by designations such as TR0, TR4 and TR5. The starting fuel-pressure at the injection nozzle will hereinafter be referred to as $P_{cd}$. For the purpose of brevity, the injection nozzle will hereinafter be called an "injector."

To be successful with ignition with a given fuel, under given temperature and altitude conditions, it is necessary that the starting pressure $P_{cd}$ should have a very precisely determined optimum value, with a tolerance of the order of ±50 grams per square centimetre in certain types of jet engines. The variation in the temperature of the combustion chamber at the moment when ignition or re-ignition is to be effected, particularly the variation under the influence of altitude, is liable to alter this optimum value and thus may be a cause of failure to ignite or re-ignite. If extinction occurs at high altitude, it will generally not be possible to successfully achieve re-ignition without descending to the altitude for which the $P_{cd}$ value has been adjusted.

We have found that it is possible to obtain ignition or re-ignition of a jet engine under all the conditions under which it is called upon to operate, and in particular at various temperatures and altitudes and with various starting fuels, by modulating the starting fuel-pressure ($P_{cd}$) at the injector, that is to say, by causing it to oscillate or fluctuate between an upper limit and a lower limit which are far enough apart to cover the various optimum values of the $P_{cd}$ corresponding to these conditions, with a given rhythm or frequency depending on the jet engine. According to the present invention there is arranged in the circuit supplying the injector with starting fuel, a pressure modulator which causes the pressure of the fuel to fluctuate with this rhythm and between these limits while the ignition means of the combustion chamber are continuously supplied with fuel.

In one constructional form of the invention, the modulator is constituted by a device which opens and closes a valve arranged in the starting fuel circuit with the optimum rhythm.

The $P_{cd}$ range to be covered depends on the operation of the engine and on the working of the fuel or fuels employed. The open periods and closed periods of the valve are determined as a function of the control circuit and the inertia of the valve, in such manner as to cover this range and to exceed it slightly at both ends.

Of course, the optimum rhythm will be determined experimentally for each type of jet engine. For example, we have established, following tests carried out on one of the types of turbo-jet engines which we construct, using various starting fuels (such as TR0 and TR4) and under various conditions (such as ignition on the ground with engine hot, re-ignition with engine hot and re-ignition in flight), that the most favourable modulation rhythm entails successive opening and closing of the valve for respective periods of $6/10$ second and $4/10$ second. If a departure is made from this rhythm, the success of ignition or re-ignition is distinctly less regular.

Consequetnly, according to the present invention, ignition and re-ignition tests are carried out on the ground, these consisting in subjecting the jet engine successively to a plurality of working conditions graded between the conditions prevailing at zero altitude and those at the maximum altitude for which the engine is designed and in injecting the starting fuel into the combustion chamber, for each of the conditions tested, at a pressure fluctuating between limits covering the range of the optimum $P_{cd}$ pressures which permit the ignition of the engine under all the working conditions, and with various rhythms, while operating the ignition means of the chamber. In this way the optimum rhythm which will ensure ignition and re-ignition under all the conditions tested will be determined and ignition and re-ignition in flight will then be ensured by causing the $P_{cd}$ value to fluctuate with this optimum rhythm and between these limits and by maintaining in the chamber at the same time a point which is in a state of ignition. To this end, the jet engine is equipped with a pressure modulator which is capable of modulating the $P_{cd}$ with this rhythm and between these limits, and with means for operating the ignition device of the combustion chamber during the ignition time.

The valve is advantageously remotely controlled electrically, as in the normal arrangement which enables the pilot to supply the injector with starting fuel. Standard electric valves used at the present time have very low inertia and are capable of effecting as many as thirty opening and closing actions per second. They are therefore very amply capable of following a rhythm of the order referred to above, such as will be imposed on them by the modulation device.

The description which follows with reference to the accompanying drawing is given by way of non-limitative example and will make the details of the invention and the manner of carrying it into effect clearly understood, any arrangement appearing both from the text and from the drawings coming within the scope of the invention. The single diagrammatic figure of the drawing illustrates the principle of a pressure modulator according to the invention.

Referring to the drawing, the injector 12 of a turbo-jet engine is supplied with starting fuel by an electric valve 1 comprising an outlet 2 connected to the injector 12 and an inlet 3 connected to a pump 13 which supplies the starting fuel at a pressure higher than all the values of $P_{cd}$ which correspond to the various conditions in which the jet engine will be used.

The electric valve 1 may be of a known type, such as is capable, for example, of effecting some thirty opening and closing actions per second. The valve disc 4 closes under the action of a spring 5 and opens under the action of an electromagnet 6 when the latter is energized.

The terminals 7 and 8 of the electromagnet are connected to modulation device 9 which is connected by a switch 10 to a source of current connected to the terminals 11. The device 9 is designed to open and close the electrical circuit of the electromagnet 6 with the optimum predetermined rhythm when the switch 10 is closed. For example, in the case of the turbo-jet engine mentioned above, the circuit of the electromagnet will be closed for $6/10$ second, then opened for $4/10$ second, then closed again for $6/10$ second, and so on.

The modulating device 9 is known per se. Those skilled in the art are capable of making such a device, for example by means of a combination of slow-acting electromagnetic or electronic switches.

The terminals 11 are also connected, over the switch 10, with a resistor 15 which is kept in an incandescent state as long as the switch 10 is closed and is carried by a silicon carbide rod 16, which constitutes a spark plug of the so-called rod type and is located inside an ignition ante-chamber 17. The injector 12 opens into this chamber 17 in front of the spark plug 16.

To effect ignition or re-ignition, the pilot closes the switch 10. The modulation device 9, placed under voltage in this way, opens and closes the circuit of the electromagnet 6 with the optimum rhythm and this causes the electric valve 1 to close and open with the same rhythm. The starting fuel is delivered through the outlet 2 to the injector at a pressure which is modulated with this rhythm. The ignition spark plug 16 is at the same time permanently heated and therefore the ignition of the turbo-jet engine takes place.

If on the contrary an ignition spark were produced in the combustion chamber only at a moment when the supply valve of the injector is open, there would be a very good chance of the ignition not occurring, even if the attempt were repeated several times in succession.

It is obvious that the constructional forms described are only examples and they could be modified, in particular by substituting technical equivalents without thereby departing from the scope of the invention as defined by the claims. In particular, the pressure modulation does not necessarily involve the use of electric current or electronic arrangements. For example, it would be possible to arrange, in the supply system for the starting fuel, a valve which opens and closes hydraulically or pneumatically with the optimum rhythm.

What we claim is:
1. A method of effecting the ignition or the re-ignition in flight of the combustion chamber of an aviation jet engine, wherein there is injected into said chamber a starting fuel whose optimum pressure which permits the ignition of the engine varies within a given range according to the working conditions of the engine, the method including the steps of
   (a) carrying out ignition tests by subjecting the engine, on the ground, to a plurality of said working conditions in succession, said conditions being graded between the conditions corresponding to zero altitude and the conditions corresponding to the maximum altitude for which the engine is designed, and by injecting the starting fuel into the chamber, under each of the said conditions, at a pressure which oscillates at various frequencies, between two limits which cover said range of optimum pressures, in order to determine an optimum oscillation frequency which will ensure ignition under all the conditions tested, and
   (b) effecting ignition in flight by injecting the starting fuel at a modulated pressure oscillating between said limits at said optimum frequency and maintaining in the chamber a point which is in a state of ignition.

2. In an aviation jet engine having a combustion chamber, a device for effecting ignition or re-ignition therein, comprising ignition means in the chamber, a starting injection nozzle opening into the chamber, a fuel source for the supply of starting fuel at a pressure higher than all the optimum values of the pressure of said starting fuel which will permit the ignition of the engine under the various working conditions of the latter, means connecting the source to the injection nozzle and including modulating means for opening and closing said connecting means alternately during constant open and closed periods and means for operating the ignition means during operation of the modulating means.

3. A device according to claim 2, wherein the modulating means is adapted to provide open and closed periods having a duration of a few tenths of a second, with the closed periods longer than the open periods.

4. A device according to claim 2, wherein the modulating means is adapted to provide open periods of about 0.6 second duration and closed periods of about 0.4 second duration.

References Cited by the Examiner
UNITED STATES PATENTS
2,272,094   2/1942   Murphy.
3,178,884   4/1965   Boardman _____ 60—35.6

JULIUS E. WEST, *Primary Examiner.*